United States Patent [19]
Aoki et al.

[11] Patent Number: 4,597,079
[45] Date of Patent: Jun. 24, 1986

[54] REDUNDANT SWITCHOVER SYSTEM FOR TDMA SATELLITE COMMUNICATION EQUIPMENT

[75] Inventors: Shinichiro Aoki, Sagamihara; Ryushiro Yoshizawa, Yokohama, both of Japan

[73] Assignee: Fujitsu Limited, Kawasaki, Japan

[21] Appl. No.: 589,944

[22] Filed: Mar. 15, 1984

[30] Foreign Application Priority Data

Mar. 16, 1983 [JP] Japan .............................. 58-043801

[51] Int. Cl.$^4$ ............................ H04J 3/14; H04J 3/16
[52] U.S. Cl. ...................................... 370/104; 370/16
[58] Field of Search .......................... 370/104, 16, 13; 455/12, 13; 375/3

[56] References Cited
U.S. PATENT DOCUMENTS 4,397,018 8/1983 Fennel, Jr. et al. ................. 370/104

Primary Examiner—Douglas W. Olms
Attorney, Agent, or Firm—Staas & Halsey

[57] ABSTRACT

In a redundant switchover system for a TDMA satellite communication system for relaying messages from earth station to earth station (A, B, C) via a communication satellite (SAT), an initially active terminal unit (1) for determines at an early stage that the transmit burst synchronization is lost, and an initially stand-by terminal unit (2) determines at a later stage that the transmit burst synchronization is lost. Thus, a fault in only the transmit portion of a first unit, which is undetected by other means, is detected by the first terminal unit, but not the second terminal unit. The second terminal unit does not determine loss of transmit burst synchronization until after the second transmit portion has been in operation for a sufficient period of time to establish whether it is operating properly.

8 Claims, 22 Drawing Figures

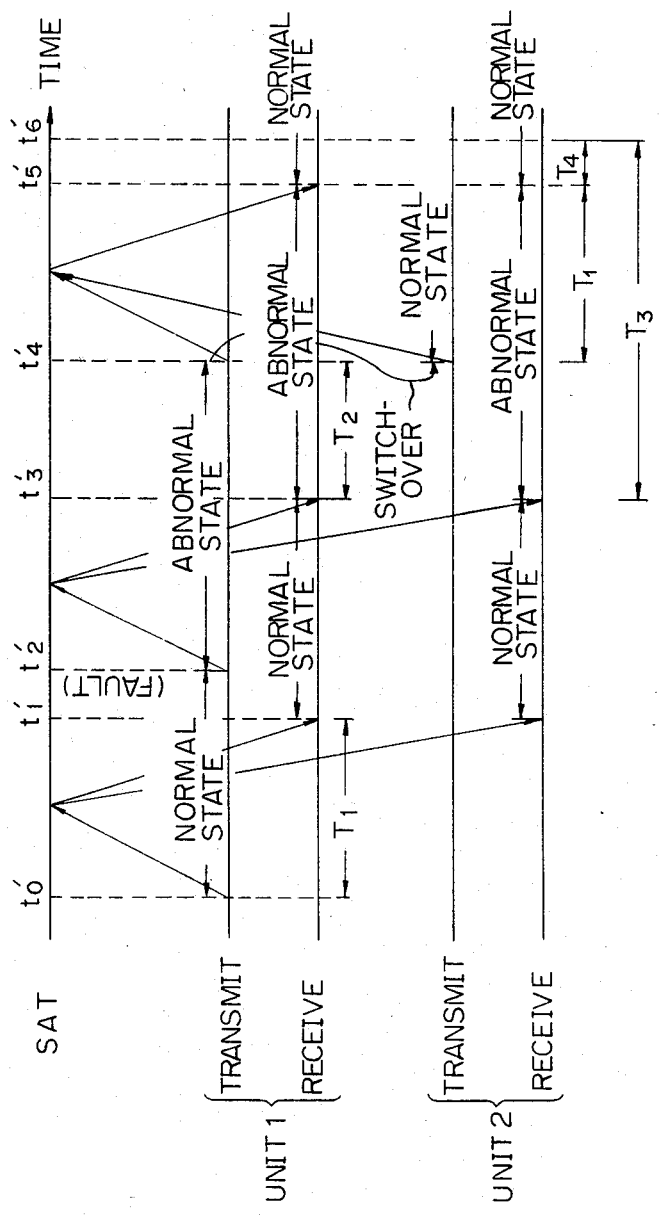

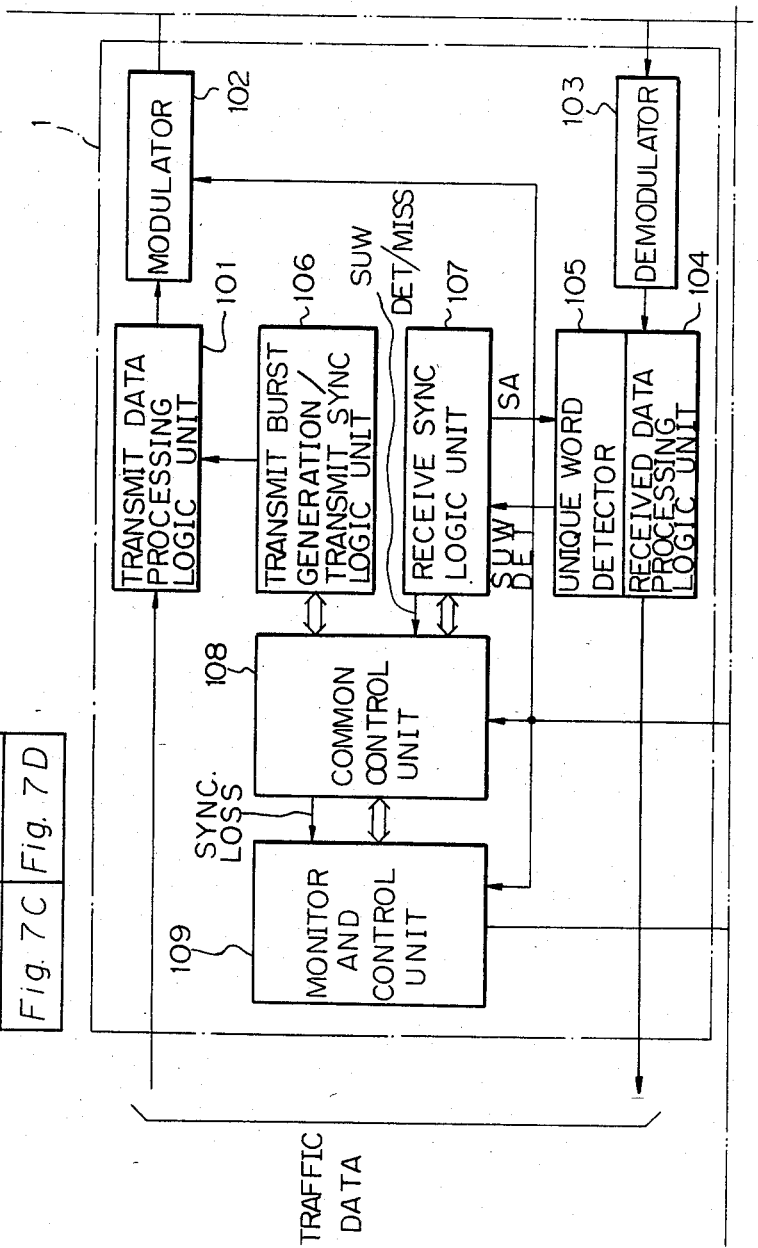

REDUNDANT SWITCHOVER SYSTEM FOR TDMA SATELLITE COMMUNICATION EQUIPMENT

BACKGROUND OF THE INVENTION

1. Field of the Invention

The present invention relates to a redundant switchover system for a time division multiple access (TDMA) device.

2. Description of the Prior Art

In a TDMA satellite communication system, messages are relayed from earth station to earth station via a common communication satellite by using the same up link and down link frequency, respectively. In this case, a TDMA frame is divided into a plurality of time slots allocated to the earth stations. Therefore, each earth station transmits its own burst in an allocated time slot for the satellite, and each earth station receives bursts from the satellite.

The transmit timing of the burst of each station is determined according to reference bursts transmitted by so-called reference stations. That is, each earth station continuously monitors the reference bursts and its own burst and controls its own burst transmit timing to maintain its own burst in the allocated slot at the satellite. Such control for burst transmit timing is called transmit burst synchronization, and is most important for a TDMA satellite communication system.

Some earth stations have a redundant configuration. That is, each earth station has a double-structure comprising an active TDMA terminal unit and a stand-by TDMA terminal unit. When a fault is detected in the active terminal unit, the active terminal unit is switched to the stand-by unit, thereby continuing communication via the satellite.

In more detail, the above-mentioned active and standby TDMA terminal units are combined by a switching-/distributing portion and a common radio frequency (RF) portion connected to an antenna. Therefore, if a fault is generated in the switching/distributing portion or the common RF portion, such a fault cannot be saved or corrected, even when the active unit is switched to the stand-by unit. On the other hand, if a fault is generated in the active unit itself, such a fault can be saved or avoided by switching the active unit to the stand-by unit.

In the detection of such a fault, one approach is for the earth station to monitor the presence or absence of its own burst signals, i.e., the transmit burst synchronization state, by detecting a unique word of its own burst included in the received bursts. If no burst is detected in the time slot allocated to its own burst, the active unit declares that the transmit burst synchronization is lost. This loss of transmit burst synchronization is mainly due to three phenomena, as follows:

(I) The transmit portion of the active TDMA terminal unit contains a fault which can be detected by other alarm monitor means.

(II) The transmit portion of the common RF portion contains a fault.

(III) The transmit portion of the active TDMA terminal unit contains a fault which cannot be detected by other alarm monitor means. For example, the transmit burst includes an erroneous unique word or burst identification code, a transmit burst timing deviated from the allowable zone, inadequate modulation, or a cable disconnection between the active unit and the switching portion.

For phenomenon I, a loss of the transmit burst synchronization can be saved or corrected by the switchover from the active unit to the stand-by unit caused by the alarm detection means. For phenomenon II, a loss of the synchronization cannot be saved or corrected by switching the active unit to the stand-by unit. Also, for phenomenon III, a loss of the synchronization cannot be saved or corrected, since both the active and stand-by units carry out a detecting operation for the loss of the synchronization upon the received bursts, simultaneously, so that the stand-by unit as well as the active unit declares that the transmit burst synchronization is lost. Therefore, for phenomena II and III, communication is suspended to carry out a burst transmit timing acquiring operation, i.e., an initial aquisition.

SUMMARY OF THE INVENTION

It is an object of the present invention to provide a redundant switchover system in TDMA satellite communication equipment in which a loss of transmit burst synchronization due to the above-mentioned phenomenon III can be saved or corrected by switching from the active unit to the stand-by unit.

According to the present invention, the determination of a loss of the transmit burst synchronization in the stand-by unit is deferred, compared with the determination of a loss of the transmit burst synchronization in the active unit. As a result, if a loss of the transmit burst synchronization due to phenomenon III occurs, only the active unit declares that the transmit burst synchronization is lost.

The above determination is performed by a system comprising means for transmitting data to and receiving data from a satellite and first and second terminal units for generating transmit bursts which contain the data and for determining loss of transmit burst synchronization. One of the terminal units performs the function of the active unit described above, and the other performs the function of the stand-by unit. Each of the first and second terminal units comprises detecting means for detecting accurate reception of the transmit bursts and controlling means for counting a number of non-detections of transmit bursts and determining loss of transmit synchronization under different criteria depending on whether the terminal unit is the active unit or the stand-by unit.

Note, a loss of the transmit burst synchronization due to phenomenon II cannot be saved or corrected by the present invention.

BRIEF DESCRIPTION OF THE DRAWINGS

The present invention will be more clearly understood from the description as set forth below with reference to the accompanying drawings:

FIG. 6 is a timing diagram explaining the operation of the redundant switchover system according to the present invention;

FIG. 7, including FIGS. 7A–7D, is a detailed block diagram of the redundant switchover system shown in FIG. 3;

FIG. 10 including

DESCRIPTION OF THE PREFERRED EMBODIMENTS

Figure 1:
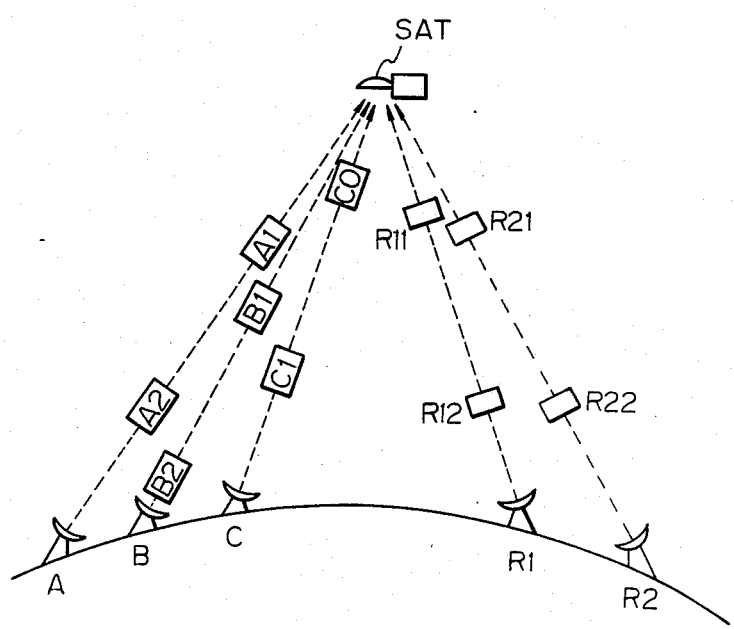
FIG. 1 is a schematic diagram of a general TDMA satellite communication system.
Figure 2:
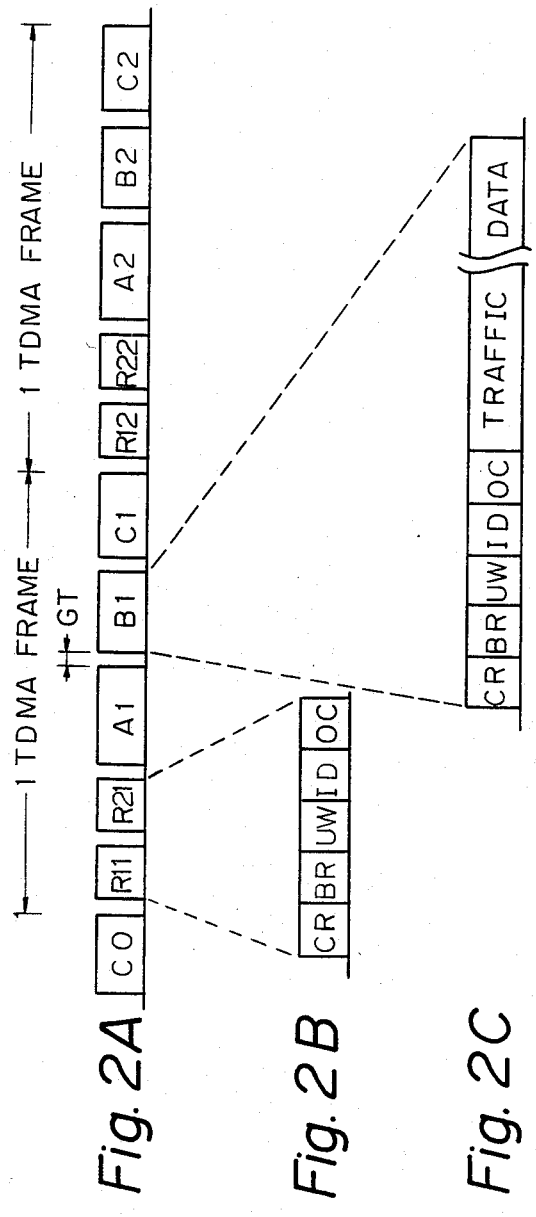
FIG. 2A is a timing diagram of an example of a TDMA frame appearing in the system shown in FIG. 1.
FIG. 2B is a timing diagram of the reference burst shown in FIG. 2A.
FIG. 2C is a timing diagram of the data burst shown in FIG. 2A.

FIG. 1 illustrates a general TDMA satellite communication system, in which references A, B, and C designate earth stations which communicate messages with each other via a communication satellite SAT. References R1 and R2 also designate earth stations which are, in this case, reference stations. The earth stations A, B, and C transmit data bursts A1, A2, . . . ; B1, B2, . . . ; and C0, C1, . . . ; respectively. In a TDMA system, such data bursts are arranged time-divisionally at the satellite SAT. That is, the data bursts are allocated their own respective time slots with reference to the reference bursts illustrated in FIG. 2A. One TDMA frame is comprised of, for example, the reference bursts R11 and R12, and the data bursts A1, B1, and C1, which have guard time periods GT therebetween. A reference burst such as R11 is comprised of a carrier pattern CR such as "0000 . . . " or "1111 . . . ", a bit timing recovery pattern BR such as "0101 . . . ", a unique word UW, a burst identification ID, and an overhead channel OC and the like, as illustrated in FIG. 2B. A data burst such as B1 is comprised of a carrier pattern CR, a bit timing recovery pattern BR, a unique word UW, a burst identification ID, an overhead channel OC, and traffic data and the like, as illustrated in FIG. 2C.

In a TDMA communication system, in order to transmit a sequence of bursts time-divisionally to the satellite SAT, synchronization of the transmit bursts is indispensable. Such synchronization is carried out by detecting the unique word UW of its own burst included in the bursts.

Figure 3:
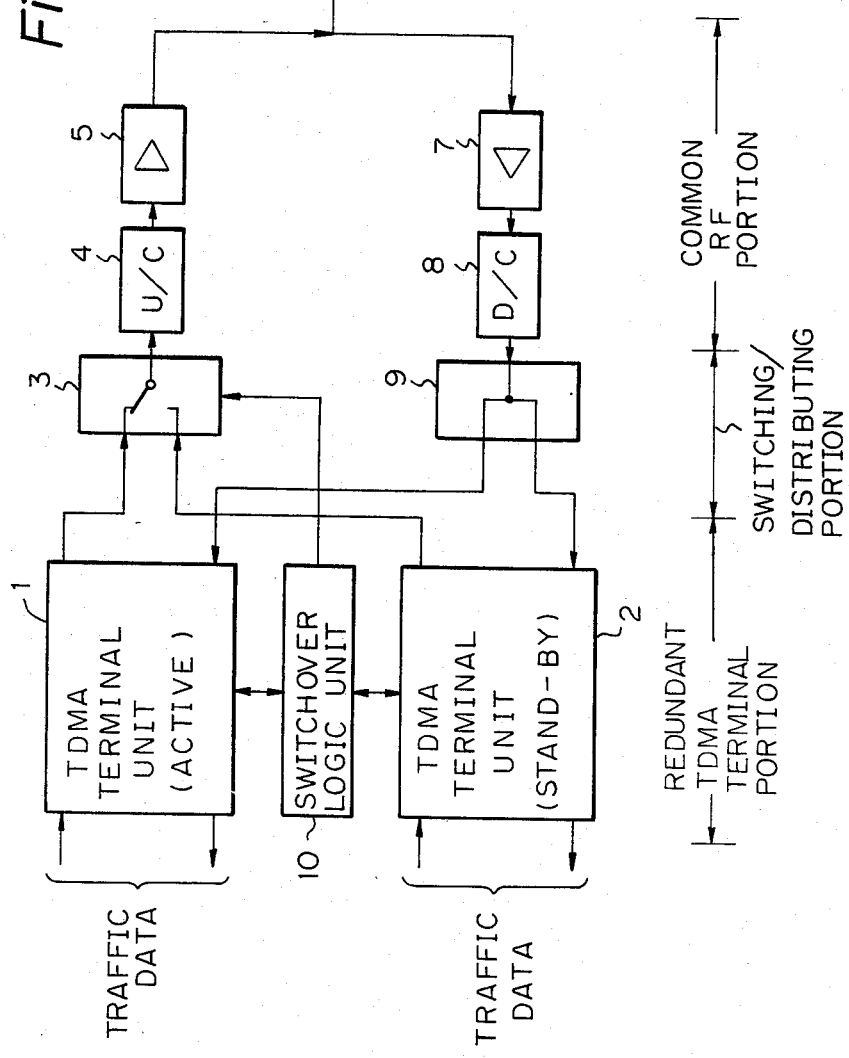
FIG. 3 is a block diagram of an embodiment of the redundant switchover system according to the present invention.

In FIG. 3, which illustrates an embodiment of the redundant switchover system according to the present invention, reference numerals 1 and 2 designate TDMA terminal units, 3 designates a switch for selecting one of the terminal units 1 and 2, 4 designates an up converter which is a kind of frequency converter, 5 designates a high power transmitter, and 6 designates an antenna. In addition, reference numeral 7 designates a low noise receiver, 8 designates a down converter which is also a kind of frequency converter, and 9 designates a distributor. The switch 3 is controlled by a switchover logic unit 10. In FIG. 3, assuming that the terminal unit 1 is active, and that the terminal unit 2 is stand-by, then a transmit signal is supplied from the active terminal unit 1 via the switch 3 and the up converter 4 to the transmitter 5, and is transmitted from the antenna 6 to the satellite SAT (FIG. 1). But, a transmit signal from the stand-by terminal unit 2 is not supplied to the up converter 4 by the switch 3. That is, only one transmit signal or burst from either the terminal unit 1 or the terminal unit 2 is supplied to the up converter 4.

Contrary to the above, a signal received by the antenna 6 is supplied via the receiver 7 and the down converter 8 to the distributor 9, and is supplied to both of the terminal units 1 and 2.

Therefore, in a normal state, the synchronization of transmit signals, i.e., transmit bursts, is realized in the active terminal unit 1 by the received bursts. Simultaneously, in a normal state, the synchronization of transmit bursts is realized in the stand-by terminal unit 2 by the received bursts, although the transmit bursts from the terminal unit 2 are not transmitted to the satellite SAT.

Each of the terminal units 1 and 2 is usually provided with means for detecting the signal states therein. For example, the detecting means monitors the following:
whether or not a burst is present with an adequate level at the output of a modulator;
whether or not data signal clock signals, a burst enable signal and the like are present at the input of the modulator for predetermined time periods;
whether or not a preamble word including a unique word is present for a predetermined frame time period at the input of the modulator;
whether or not a data scrambling pattern is present;
whether or not a transmit frame counter is operated at every regular time period;
whether or not a burst timing signal is generated at every regular time period;
whether or not bursts are present with an adequate level at the input of a demodulator;
whether or not a data signal, clock signals, and the like are present at the output of the demodulator for predetermined time periods;
whether or not the unique word detection signals exist for a predetermined time period.
whether or not a descrambling pattern is present;
whether or not the time period of the generation of an aperture signal is correct;
whether or not a receiver frame counter is operated at every regular time period;
whether or not various controllers such as central processing units (CPU) are operating correctly; and
whether or not a power supply voltage is correct.

Figure 4:
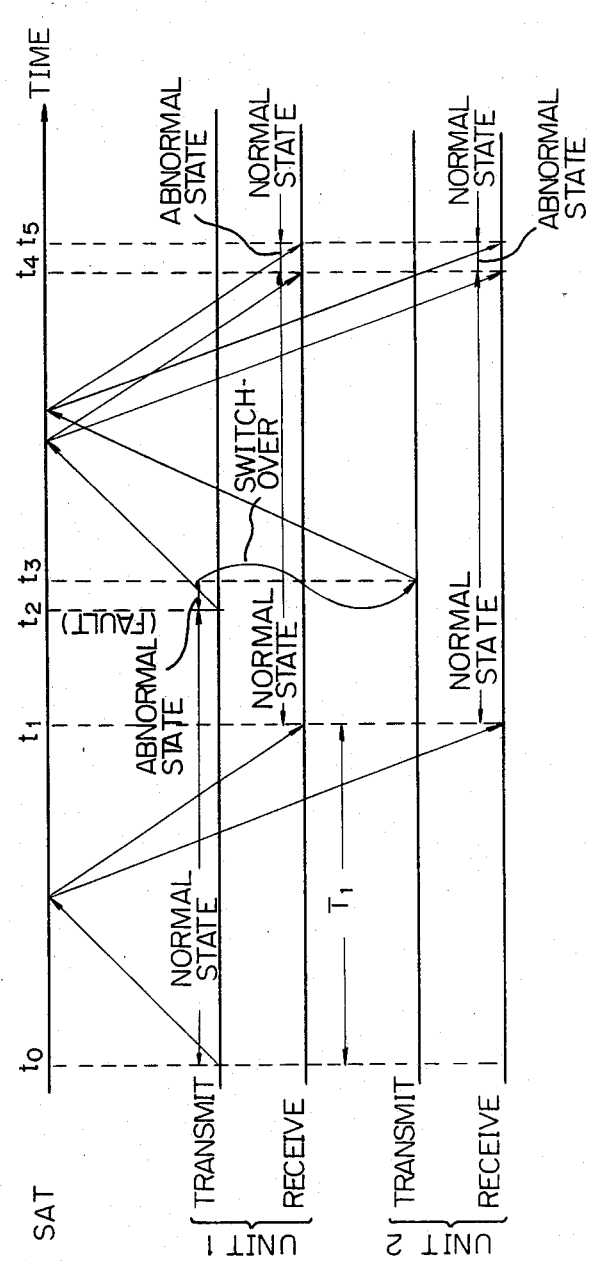
FIG. 4 is a timing diagram explaining the operation of a prior art redundant switchover system.

Therefore, when a fault is detected in the signal states of a conventional device by the above-mentioned means, the terminal unit 1 or 2 transmits a switchover request signal to the switchover logic unit 10, thereby carrying out a redundant switchover. As a result, the switch 3 is operated to connect the terminal unit 2 to the up converter 4. That is, in FIG. 4, from time $t_0$ to $t_2$, the transmit portion of the terminal unit 1 is in a normal state, and accordingly, the receive portions of the terminal units 1 and 2 are also in a normal state, from time $t_1$ to time $t_4$. At time $t_2$, a fault is generated in the transmit portion of the terminal unit 1, and at time $t_3$, this fault is detected by the detecting means, and a switchover occurs so that the terminal unit 2 is connected by the switch 3 to the up converter 4. As a result, for a time period from time $t_4$ to $t_5$, the receive portions of the terminal units 1 and 2 are in an abnormal state, in which their own abnormal data burst is received. Then, at time $t_5$, both of the receive portions of the terminal units 1 and 2 return to a normal state. Note that $T_1$ is one round trip time period (about 270 ms), which is the time required for a signal to complete a round trip between an earth station and the satellite SAT.

However, as explained before, if a fault is generated in the switching/distributing portion formed by the elements 3 and 9, or in the common RF portion formed by the elements 4, 5, 7, and 8, this fault cannot be saved or corrected even when a redundant switching operation is carried out. That is, at time $t_3$ shown in FIG. 4, when the terminal unit 2 is switched to an active mode, the transmit signal from the terminal unit 2 cannot be supplied to the antenna 6, or the receive portions of the terminal units 1 and 2 cannot receive the burst received by the antenna 6. As a result, the receive portions of the terminal units 1 and 2 cannot return to a normal state even after time $t_5$.

Note, all faults are not always detected by the above-mentioned detecting means. If a fault in the transmit portion has not been detected by the detecting means, neither of the receive portions of the terminal units 1 and 2 can receive a transmit burst simultaneously, and accordingly, the transmit burst synchronization is lost. This kind of transmit synchronization loss may occur due to the above-mentioned phenomenon III.

Figures 5A, 5B, 5C:
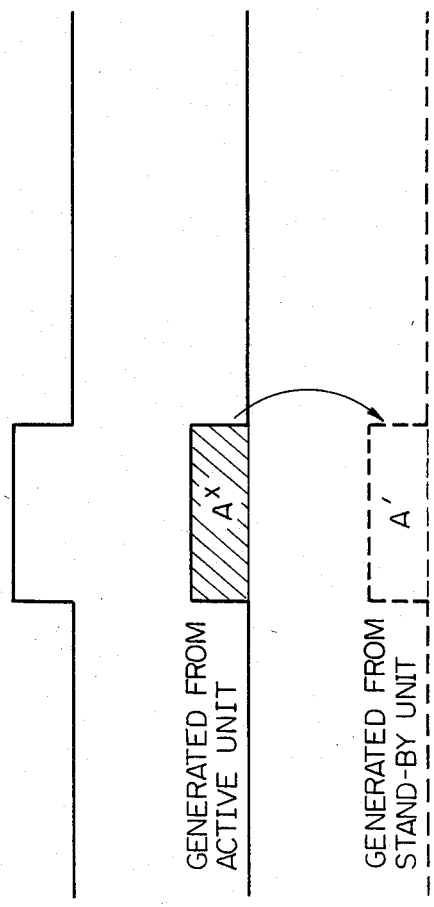
FIGS. 5A, 5B, and 5C are timing diagrams explaining an example of the loss of transmit burst synchronization.

Phenomenon III will be explained with reference to FIGS. 5A, 5B, and 5C. As shown in FIGS. 5A and 5B, a burst to be received may be present in the allocated time slot. However, in this case, for example, this burst $A^x$ may include a data error such as an invalid unique word. Therefore, when the active terminal unit 1 is operated, the receive portions of both of the terminal units 1 and 2 cannot receive the burst $A^x$. However, when the active terminal unit 1 is switched to the stand-by terminal unit 2, the burst $A^x$ including a data error is switched to a burst $A'$ generated from the terminal unit 2, as shown in FIG. 5C. In this case, this burst $A'$ includes no data error. Therefore, it is possible to save or correct a fault due to phenomenon III. For this purpose, in the present invention, the determination of the loss of the transmit burst synchronization in a stand-by terminal unit is later than the determination of the loss of the transmit burst synchronization in an active terminal unit.

FIG. 6, which illustrates the operation of the redundant switchover system according to the present invention, also assumes that the terminal units 1 and 2 are active and stand-by, respectively. The transmit portion of terminal unit 1 is in a normal state from time $t_0'$ to time $t_2'$, and accordingly, the receive portions of the terminal units 1 and 2 are also in a normal state from time $t_1'$ to time $t_3'$. At time $t_2'$, a fault is generated in the transmit portion of the terminal unit 1. As a result, the receive portions of the terminal units 1 and 2 both enter an abnormal state caused by the resulting faulty burst at time $t_3'$. This abnormal state continues. At time $t_4'$ after a time period $T_2$, only the receive portion of the terminal unit 1 declares that the transmit burst synchronization is lost. Therefore, a redundant switchover operation is carried out at time $t_4'$. In this state, the receive portion of the terminal unit 2 does not declare that the transmit burst synchronization is lost. As a result, if the abnormal state of the transmit portion of the terminal unit 1 is due to the above-mentioned phenomenon III, the receive portions of the terminal units 1 and 2 return to a normal state at time $t_5'$ after one round trip time period $T_1$. Clearly, in this case, it is necessary that the transmit portion of the terminal unit 2 be in a normal state.

Then at time $t_6'$ after a predetermined time period $T_4$, the receive portion of the terminal unit 2 determines whether or not the transmit burst synchronization is lost. Due to phenomenon III, since the receive portion of the terminal units 1 and 2 are already in a normal state, the receive portion of the terminal unit 2 does not declare that the transmit burst synchronization is lost, thereby carrying out no redundant switchover. Thus, a fault due to phenomenon III is saved or corrected.

In FIG. 6, note that $T_3 > T_1 + T_2$ (about 800 ms) is required.

Also, it is apparent that a fault due to phenomenon II cannot be saved or corrected by the operation as illustrated in FIG. 6, since the receive portions of the terminal units 1 and 2, in this case, never return to a normal state even after time $t_5'$.

Figure 7B:
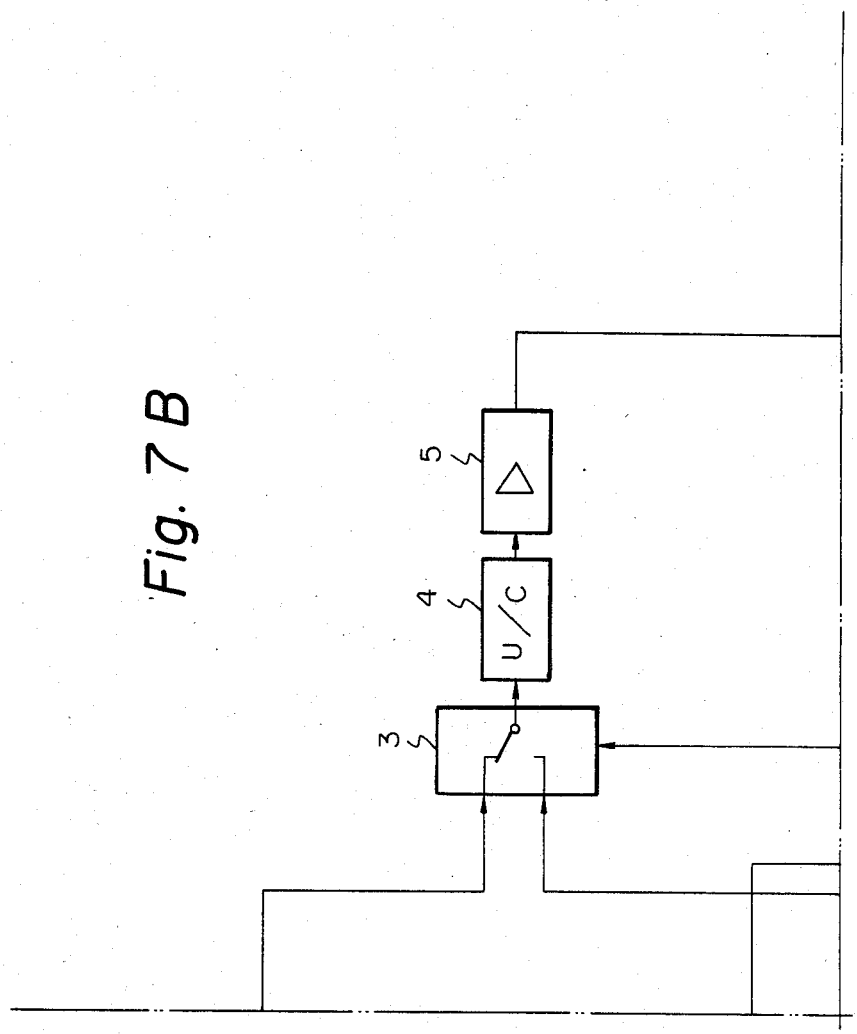
Figure 7C:
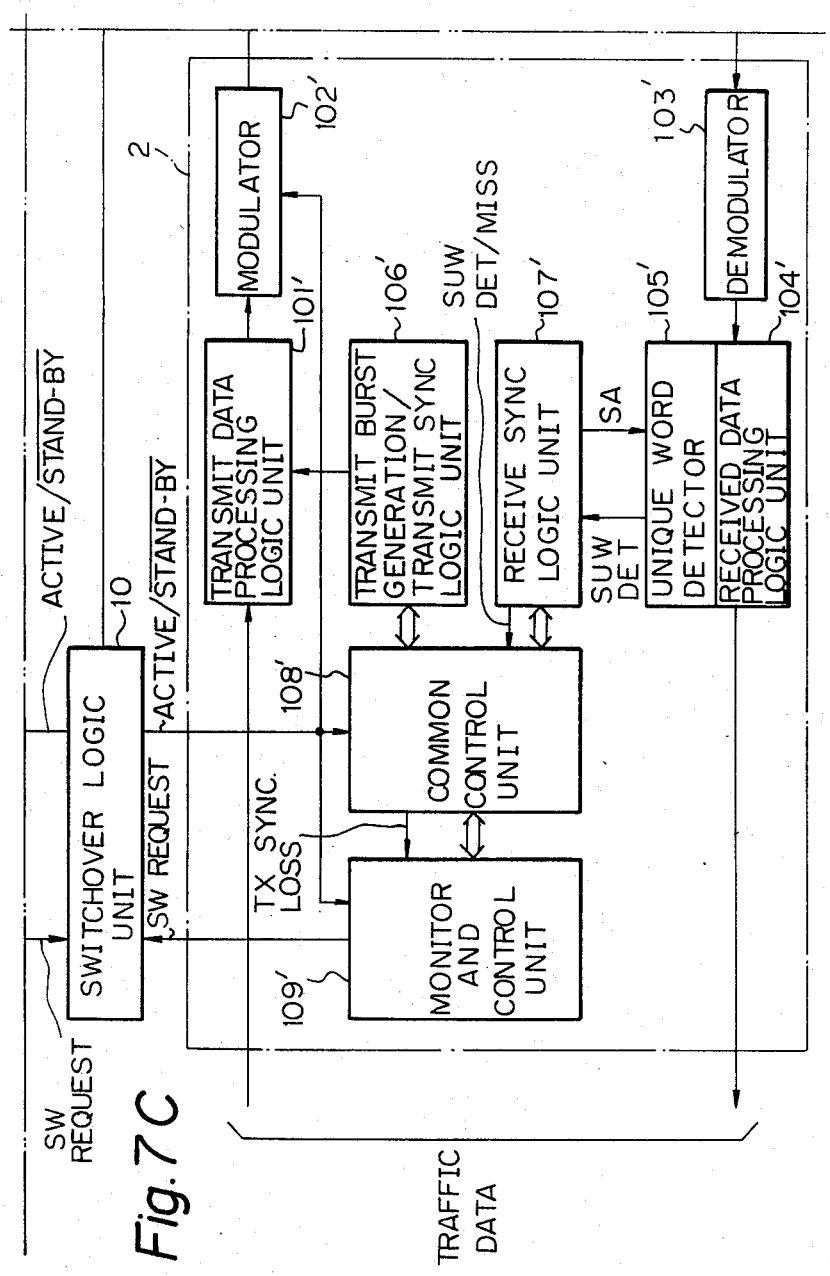
Figure 7D:
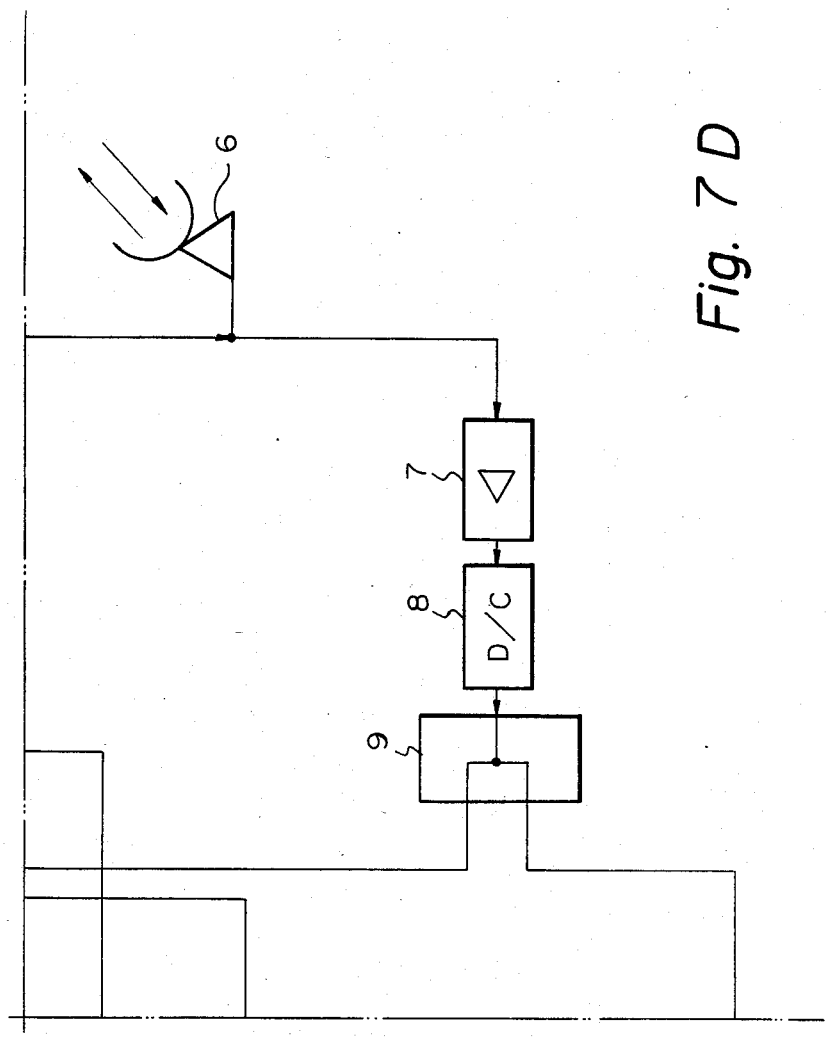

In FIG. 7, which is a detailed block diagram of the system shown in FIG. 3, the terminal units 1 and 2, which have the same configuration, are illustrated in detail. Each of the terminal units 1 and 2 comprise a transmit data processing logic unit 101(101') for processing traffic data, a modulator 102(102'), a demodulator 103(103'), a received data processing unit 104(104'), and a unique word detector 105(105'). In addition, the data processing unit 101(101') is controlled by a transmit burst generation/synchronization logic unit 106(106'0) and the unique word detector 105(105') is controlled by a receive synchronization logic unit 107(107'). The transmit burst generation/transmit synchronization logic unit 106 and the receive synchronization logic unit 107(107') are controlled by a common control unit 108(108') connected to a monitor and control unit 109(109'). Part of the work of the common control unit 108(108') is to conduct the transmit burst synchronization through the transmit burst generation/synchronization logic unit 106 by using the detected unique word signals from the receive synchronization logic unit 107. Therefore, if no unique word signals from the transmitter's own burst are detected, it is impossible to synchronize the transmit bursts, thereby declaring that the synchronization is lost. However, usually, if only one unique word signal of the transmitter's own burst is missed, such a declaration is not issued. For example, when 20 unique word signals of its own burst are missed within successive 25 TDMA frames, such a declaration will be issued.

Figure 8:
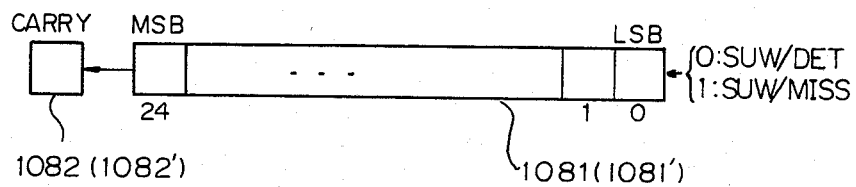
FIG. 8 is a block diagram of a shift register and a carry bit register included in the common control unit 108 shown in FIG. 7.
Figure 9:
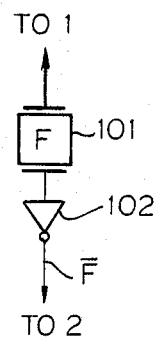
FIG. 9 is a block diagram of a flag register and an inverter included in the switchover circuit 10 shown in FIG. 7.
Figure 10A:
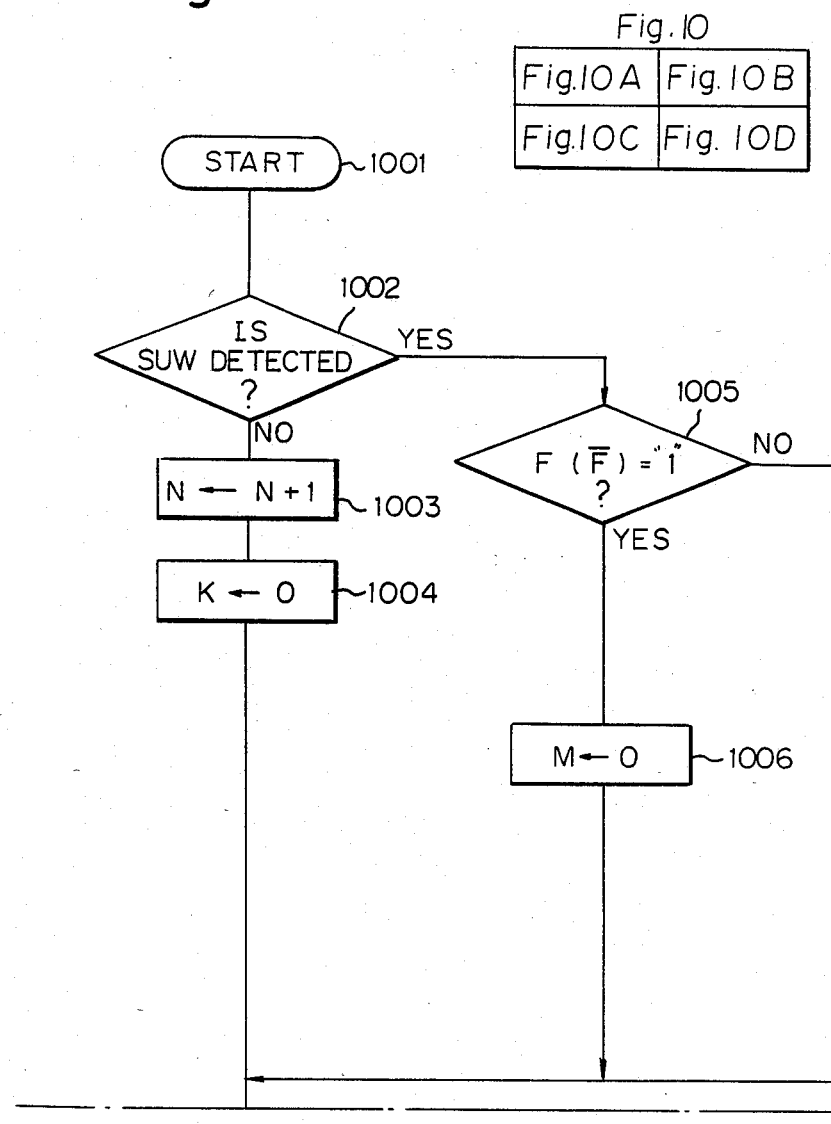
FIGS. 10A–10D, is a flowchart explaining the operation of the common control unit 108 shown in FIG. 7.
Figure 10B:
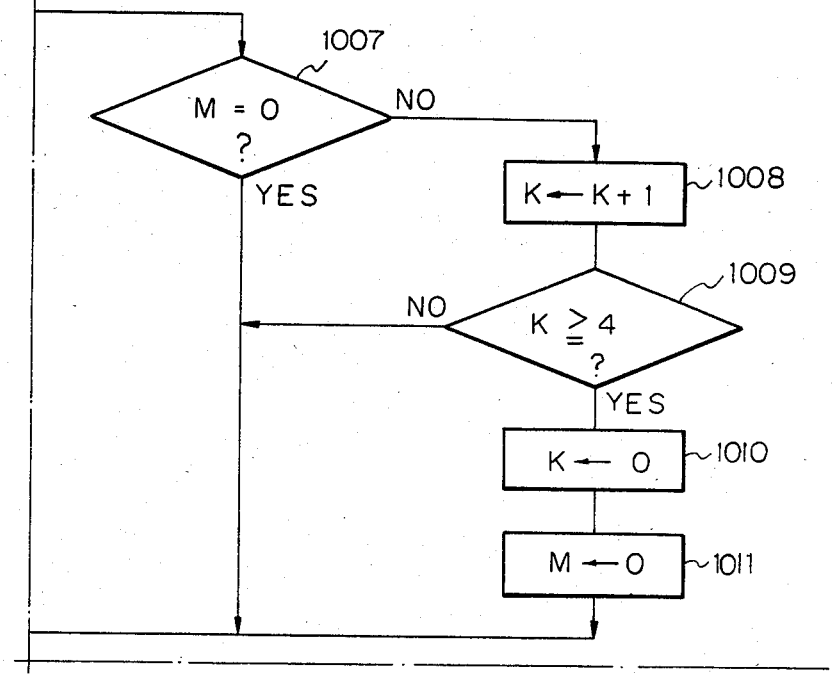
Figure 10C:
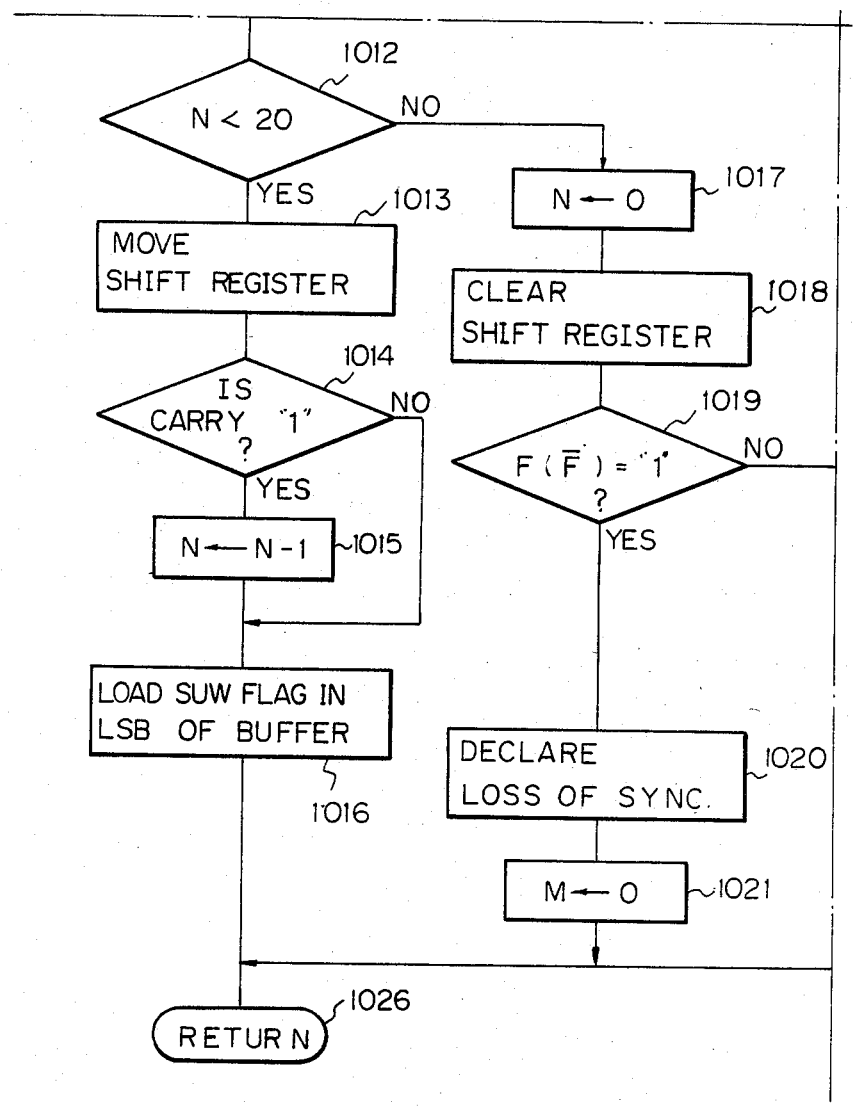
Figure 10D:
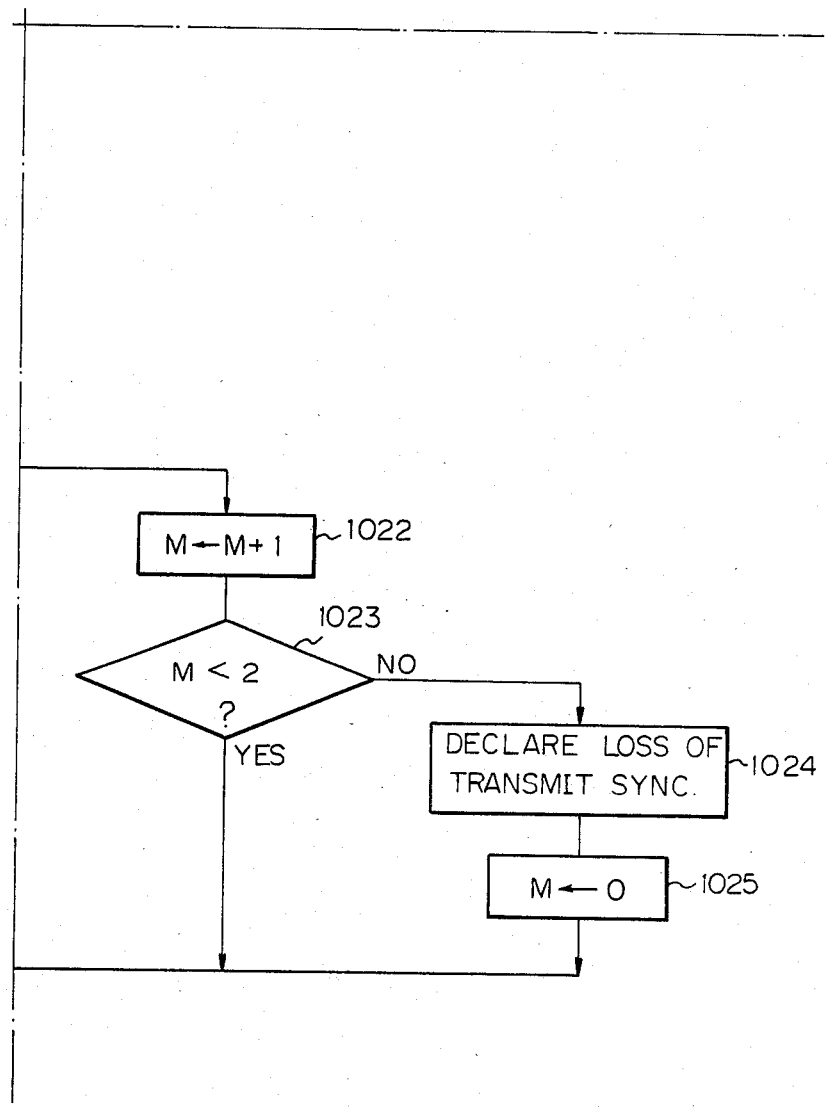

Each common control unit 108(108') comprises a 25-stage shift register 1081(1081') and a carry bit register 1082(1082'), as illustrated in FIG. 8. Further, the switchover logic unit 10 comprises a flag register 101, and an inverter 102, as shown in FIG. 9. The flag register 101 is used for a flag F which indicates whether or not the terminal unit 1 is active. That is, if the flag F is "1", the terminal unit 1 is active, and if the flag F is "0", that is, the flag $\overline{F}$ is "1", the terminal unit 2 is active.

The operation of the common control unit 108 of the terminal unit 1 is carried out by a routine illustrated in FIG. 10, and the operation of the common control unit 108' of the terminal unit 2 is also carried out by a routine illustrated in FIG. 10. In FIG. 10, note that all the registers and values are initially cleared.

The operation of the initially active terminal unit 1 will be explained. In this case, the routine in FIG. 10 is started every receive frame timing, that is, when a receive from is due to be received. Control is transferred from start step 1001 to step 1002, which determines whether a unique word signal SUW is detected or missed. Also note that the signal SUW indicates the unique word of the burst used to carry out the transmit synchronization. The unique word signal SUW is detected by the unique word detector 105, which receives an aperture signal SA from the receive synchronization logic unit 107. Since the receive synchronization logic unit 107 is controlled by the common control unit 108, the unit 108 can recognize whether the unique word signal SUW is detected or missed. If missed, control is transferred to step 1003 which increments N by +1. Control is then transferred to step 1004 which clears K. If the signal SUW is detected at step 1002, control is transferred to step 1005. In this case, since the flag F is "1", control is then transferred to step 1006 which clears M, and is further transferred to step 1012. The values K and M will be later explained. Note, the value of N indicates the number of missed SUW unique words per sequence of 25 TDMA frames. For this purpose, the shift register 1081 stores successive 25 TDMA frames' detected or missed SUW unique words.

Figure 11:
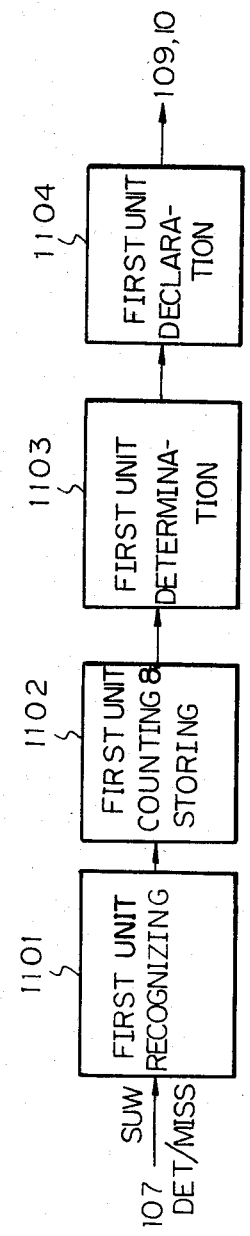
FIG. 11 is a block diagram of the functions performed by the common control unit 108 shown in FIG. 7 for a first or initially active terminal unit.

At step 1012, it is determined whether or not N<20. That is, this step determines whether or not the transmit burst synchronization is lost. If N<20, control is transferred to step 1013, which moves the shift register 1081 one place to the left, and is then transferred to step 1014, which determines whether or not the carry bit written into the carry bit register 1082 is "1". If "1", control is transferred to step 1015, which decrements N by −1. At step 1016, "0" or "1" (depending upon whether the unique word signal SUW is detected or missed at step 1002) is written into the least significant bit (LSB) of the shift register 1081. That is, if the signal SUW is detected, "0" is written into the LSB, while, if the signal SUW is missed, "1" is written into the LSB. Then the routine in FIG. 11 is completed by return step 1026.

Again, the routine in FIG. 10 will be carried out. At this time, if N≧20 at step 1012, the flow by steps 1013 to 1016 is switched to a flow by steps 1017 to 1021. At step 1017, N is cleared, and at step 1018, the shift register 1081 is cleared. Control is then transferred via step 1019 to step 1020, which declares that the transmit burst synchronization is lost in the terminal unit 1, since the flag F is "1". As a result, the monitor and control unit 109 requests a redundant switchover to the switchover logic unit 10. As a result, the flag F is reset and, accordingly, the flag F̄ is set. Thus, in terminal unit 1 which was initially active, once 20 unique word signals are missed within successive 25 TDMA frames, it is declared that the transmit burst synchronization is lost.

Again, the routine illustrated in FIG. 10 will be performed upon the terminal unit 1 which is now the stand-by unit. Therefore, if SUW is detected at step 1002, control is transferred via steps 1005 and 1007 to step 1012, since the flag F is "0" and M equals 0. At step 1012, if it is determined that N≧20 is satisfied, then control is transferred via steps 1017, 1018 and 1019 to step 1022 which increments M by +1. That is, in this case M=1. So control is transferred via step 1023 to RETURN step 1026.

Again, the routine illustrated in FIG. 10 will be performed upon the terminal unit 1. If the unique word signal SUW is detected at step 1002, control is transferred via steps 1005 and 1007 to step 1008, since flag F is "0" and M equals 1. At step 1008, K is incremented by +1. Control is then transferred to step 1009 which determines whether or not K≧4. Note, the value of K is cleared by step 1004, after even one unique word signal SUW is missed. In other words, only when a succession of four unique word signals are detected, is control at 1009 transferred to steps 1010 and 1011, which clear K and M, respectively.

If control is transferred to step 1012 without clearing M and K, and in addition, it is determined that N≧20 is satisfied, then control is transferred via steps 1017, 1018, and 1019, to step 1022, which increments M by +1. That is, in this case, M≦2. Then, control is transferred via step 1023 to step 1024. At step 1024, it is declared that the transmit burst synchronization is lost. Control is then transferred to step 1025, which clears M, and is then transferred to step 1026.

Next, the operation of the initially stand-by terminal unit 2 will be explained. Note, the routine in FIG. 10 is provided separately in the terminal units 1 and 2, respectively. Also, in terminal unit 2, the routine in FIG. 10 is started at every frame timing and F̄ is tested at steps 1005 and 1019 instead of F. Control is transferred from start step 1001 to step 1002 which determines whether a unique word signal SUW is detected or missed. If SUW is missed, control is transferred to step 1003 which increments N by +1, and is then transferred to step 1004, which clears K. Control is then transferred to step 1012. If the signal SUW is detected, at step 1002, control is transferred via step 1005 and step 1007 to step 1012, since the flag F̄ is "0" and M is initially cleared.

At step 1012, it is determined whether or not N<20. Since terminal unit 2 is presently on stand-by, this step does not determine whether or not the transmit burst synchronization is lost. If N<20, control is transferred to step 1013, which moves the shift register 1081' one place to the left, and is then transferred to step 1014, which determines whether or not the carry bit written into the carry bit register 1082' is "1". If the carry bit is "1", control is transferred to step 1015, which decrements N by −1. At step 1016, "0" or "1" (depending upon whether the unique word signal SUW is detected or missed, respectively, at step 1002) is written into the LSB of the shift register 1081'. Then the routine in FIG. 10 is completed by step 1026.

Next, the routine in FIG. 10 will be again carried out. At this time, if N≧20 at step 1012, the flow through steps 1013 to 1016 is switched to a flow through steps 1017, 1018, 1019, and 1022 1025. At step 1017, N is cleared, and at step 1018, the shift register 1081' is cleared. Since the flag F̄ is "0", control is then transferred via step 1019 to step 1022, which increments M by +1. At this point, M=1. Control is then transferred via step 1023 to step 1026. Thus, in this case, it is not declared that the transmit burst synchronization is lost in the terminal unit 2.

Again, the routine in FIG. 10 will be carried out. At this time, if the determination at step 1002 is affirmative, control is transferred via steps 1005 and 1007 to step 1008, since M=1. At step 1008, K is incremented by +1. Control is then transferred to step 1009 which determines whether or not K≧4.

If control is transferred to step 1012 without clearing M and K, and in addition, it is determined that N≧20 is satisfied, then control is transferred via step 1017, 1018, and 1019 to step 1022, which increments M by +1. In this case, M=1. Control is then transferred via step 1023 to step 1026. Thus, in this case, it is not declared that the transmit burst synchronization is lost.

However, in this state, as explained above, it is declared in the terminal unit 1 that the transmit burst synchronization is lost. As a result, the terminal unit 2 hereafter serves as an active unit. Therefore, when the routine in FIG. 10 is again performed upon the terminal unit 2, it can be declared at step 1020 that the transmit burst synchronization is lost, but only after $N \geq 20$ is satisfied at step 1012. That is, in the terminal unit 2 which was initially stand-by, when an additional 20 unique word signals are missed within the consecutive 25 TDMA frames after the terminal unit 1 declares the transmit burst synchronization is lost, the terminal unit 2 declares that the transmit burst synchronization is lost if the automatic switchover logic is disabled (phenomenon II). Therefore, if the time period of one TDMA frame is 20 ms, then $T_2$ in FIG. 6 will be $$20 \times 20 \text{ ms} \leq T_2 \leq 20 \times 25 \text{ ms}.$$

That is, $$400 \text{ ms} \leq T_2 \leq 500 \text{ ms}.$$

Therefore, in this case:

$$T_2 + 400 \text{ ms} \leq T_3 \leq T_2 + 500 \text{ ms}$$

Taking into consideration that one round trip time period $T_1$ is about 270 ms, the following relationship is satisfied:

$$T_3 - (T_2 + T_1) \geq 130 \text{ msec. } \therefore T_1 + T_2 < T_3.$$

In FIG. 11, which is a block diagram of the functions performed by the common control unit 108 of the initially active terminal unit 1, reference numeral 1101 designates a first unit recognizing step, which utilizes an SUW detection or SUW missed detection signal at every receive frame timing. The output of the first recognizing step 1101 is supplied to a first unit counting and storing step 1102, which counts the number of nondetections of the SUW provided from the first unit recognizing step 1101 and stores the count. A first unit determination step 1103 determines whether or not the number of the SUW nondetections stored by the first unit counting and storing step 1102 is more than a predetermined value. When the determination step 1103 determines that the number of the SUW nondetections is more than the predetermined value, a first unit declaration step 1104 declares that the transmit burst synchronization is lost. Further, the first unit declaration or indicating step 1104 causes the initially active and stand-by terminal units 1 and 2 to be stand-by and active, respectively, via the monitor and control unit 109 and the switchover logic unit 10.

Figure 12:
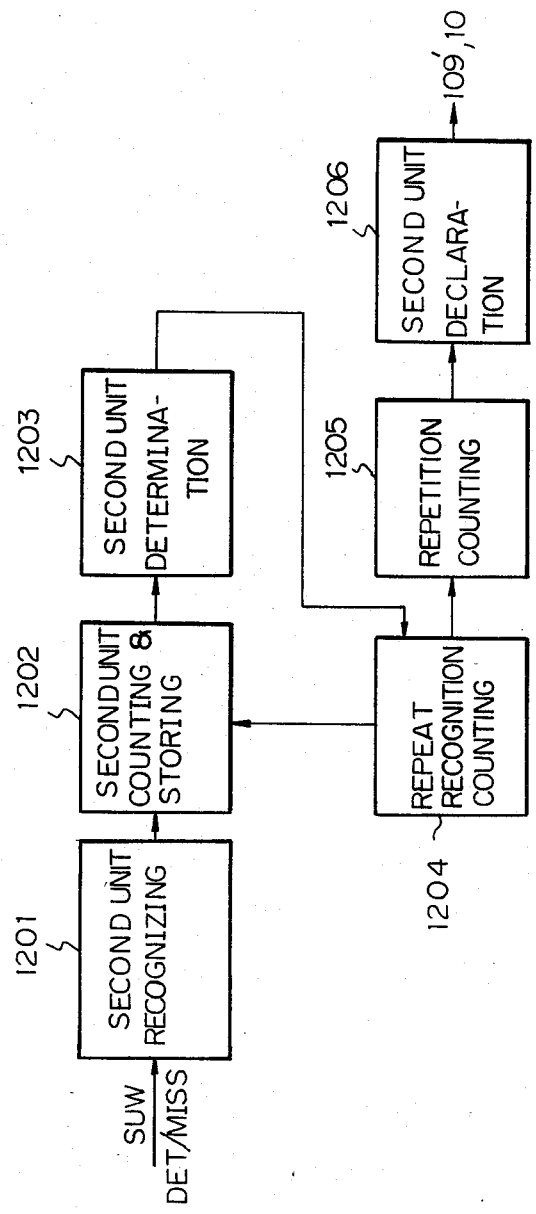
FIG. 12 is a block diagram of the functions performed by the common control unit 108 shown in FIG. 7 for a second or initially standby unit.

In FIG. 12, which is a block diagram of the functions performed by the common control unit 108' of the initially stand-by terminal unit 2, reference numeral 1201 designates a second unit recognizing step, which utilizes an SUW detection or nondetection signal at every receive frame timing. The output of the second unit recognizing step 1201 is supplied to a second unit counting and storing step 1202 which counts the number of the SUW nondetections provided from the second recognizing circuit 1201 and stores it. A second determining circuit 1203 determines whether or not the number of the SUW nondetections stored in the second counting and storing circuit 1202 is more than a predetermined value. When the determining circuit 1203 determines that the number of the SUW nondetections is more than the predetermined value, a repeat recognition step 1204 clears the count provided by the second unit counting and storing step 1202 to repeat the operations of the second unit counting and storing step 1202. This clearing operation is counted by a repetition counting step 1205. When the value of the count from the counting step 1205 reaches 2, a second declaration or indicating circuit 1206 declares that the transmit burst synchronization is lost.

We claim:

1. A redundant switchover system for an earth station of a time division multiple access satellite communication system for relaying messages from the earth station to another earth station via a communication satellite, said redundant switchover system comprising:

initially active terminal unit means for determining loss of transmit burst synchronization at a first point in time; and initially stand-by terminal unit means, operatively connected to said initially active terminal unit means, for determining the loss of transmit burst synchronization at a second point in time, the second point in time being more than one round trip time period later than the first point in time, and for switching said initially active and initially stand-by terminal unit means to a stand-by mode and an active mode, respectively, when the loss of transmit burst synchronization is determined in said initially active terminal unit means.

2. A redundant switchover system for an earth station of a satellite time division multiple access communication system for relaying messages from the earth station to another earth station via a communication satellite, said redundant switchover system comprising:

an initially active terminal unit for generating transmit bursts, comprising:

first recognizing means, operatively connected to be capable of receiving the transmit bursts at every receive frame timing, for recognizing the transmit bursts;

first counting and storing means, operatively connected to said first recognizing means, for counting a number of missed detections of the transmit bursts by said first recognizing means over a predetermined time period and for storing the number;

first determining means, operatively connected to said first counting and storing means, for determining whether the number of missed detections of the transmit bursts counted by said first counting and storing means is more than a predetermined value; and first indicating means, operatively connected to said first determining means, for indicating that transmit burst synchronization is lost and indicating that said initially active terminal unit should be switched to a stand-by mode, when the number of missed detections of the transmission bursts is more than the predetermined value; and an initially stand-by terminal unit, operatively connected to said initially active terminal unit, for switching to an active mode when said first indicating means indicates that said initially active terminal unit should be switched to the stand-by mode and for generating the transmit bursts thereafter, comprising:

second recognizing means, operatively connected to be capable of receiving the transmit bursts at every receive frame timing, for recognizing the transmit bursts;

second counting and storing means, operatively connected to said second recognizing means, for counting the number of missed detections of the transmit bursts by said second recognizing means over the predetermined time period and for storing the number;

second determining means, operatively connected to said second counting and storing means, for determining whether the number of missed detections of the transmit bursts counted by said second counting and storing means is more than the predetermined value;

repeating means, operatively connected to said second counting and storing means and said second determining means, for repeating the counting in said second counting and storing means and the determining in said second determining means by clearing said second counting and storing means, when said second determining means determines that the number is more than the predetermined value;

repetition counting means, operatively connected to said repeating means, for counting a repetition number of repetitions by said repeating means; and second indicating means, operatively connected to said repetition counting means, for indicating that the transmit burst synchronization of said initially stand-by terminal unit is lost, when the repetition number counted by said repetition counting means reaches 2.

3. A redundant switchover system as set forth in claim 2, wherein the predetermined time period is larger than one round trip time period between the earth station and the communication satellite.

4. A redundant switchover system as set forth in claim 2, wherein said initially standy-by terminal unit further comprises:

detection counting means, operatively connected to said second recognizing means, for counting a detected number of successively detected transmit bursts; and means, operatively connected to said detection counting means and said repetition counting means, for clearing the repetition number counted by said repetition counting means when the detected number of the successively detected transmit bursts is larger than another predetermined value.

5. A redundant switchover system for an earth station of a time division multiple access satellite communication system using a satellite to relay data between the earth station and another earth station, comprising:

transmitting means for transmitting transmit bursts to the satellite and for receiving the data relayed by the satellite, including the transmit bursts which are received after a round trip time period; and first and second terminal unit means, operatively connected to said transmitting means, for generating the transmit bursts and for determining loss of transmit burst synchronization in dependence upon processing of the data relayed by the satellite, said first transmit unit means being initially in an active mode and making a first determination of the loss of transmit burst synchronization, said second terminal unit means being initially in a stand-by mode and making a second determination of the loss of transmit burst synchronization following the first determination by more than the round trip time period, said first and second terminal unit means switching to the stand-by and active modes, respectively, when the first determination is made.

6. A redundant switchover system as recited in claim 5, further comprising switchover logic means, operatively connected to said transmitting means and said first and second terminal units, for indicating the switching of said first and second terminal units to the stand-by and active modes, respectively, when the first determination is made; and wherein said first and second terminal unit means each comprise:

detecting means, operatively connected to said transmitting means, for detecting whether one of the transmit bursts are included in the data relayed by the satellite each time one of the transmit bursts should be included; and controlling means, operatively connected to said switchover logic means and said detecting means, for counting a number of nondetections of the transmit bursts over a predetermined time period and determining the loss of transmit synchronization, if the number of nondetections over the predetermined time period is larger than a first predetermined number and said controlling means is in the active mode, and for counting the number of nondetections over the predetermined time period and determining the loss of transmit burst synchronization, if the number of nondetections is larger than the first predetermined number a second predetermined number of times and said controlling means is in the stand-by mode.

7. A method for controlling redundant terminal units of an earth station in a time division multiple access satellite communication system, the earth station sending transmit bursts to the satellite and receiving data, including the transmit bursts, from the satellite, said method comprising the steps of:

(a) setting a flag indicating that only one of the terminal units is in an active mode;

(b) detecting whether the transmit bursts are included in the data;

(c) counting a number of nondetections of the transmit bursts over a predetermined time period;

(d) comparing the number of nondetections with a predetermined value;

(e) determining loss of transmit burst synchronization if the number of nondetections is larger than the predetermined value and said method is being used to control the one of the terminal units in the active mode; and (f) repeating steps (c) and (d) until the number of nondetections is larger than the predetermined value for a predetermined number of repetitions, if said method is not being used to control the one of the terminal units in the active mode, then determining the loss of transmit burst synchronization.

8. A method as recited in claim 7, wherein step (b) is performed with a receive frame timing every time a transmit burst should be received by the earth station,
wherein step (f) comprises counting the number of repetitions of steps (c) and (d), and
further comprising the step of (g) restarting said counting in step (f) if transmit bursts are successively detected at every receive frame timing for another predetermined number of transmit bursts.

* * * * *